L. Jordan,
Nut Wrench.
Nº 65,489.     Patented June 4, 1867.
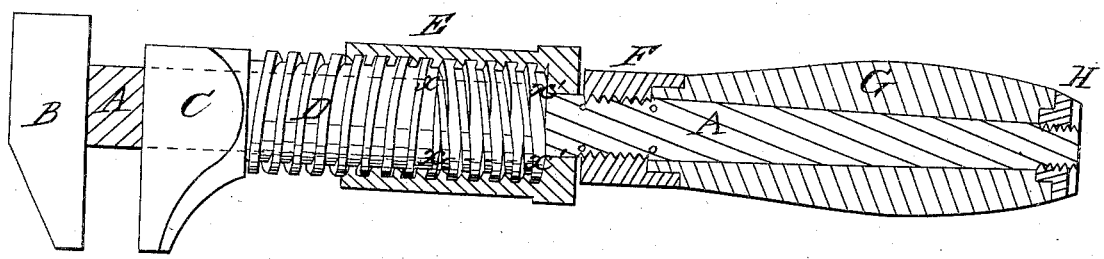
Witnesses:
Inventor:
Lucius Jordan
per
Alexander F. Mason

United States Patent Office.

LUCIUS JORDAN, OF SOUTHINGTON, CONNECTICUT.

Letters Patent No. 65,489, dated June 4, 1867.

IMPROVED WRENCH.

*The Schedule referred to in these Letters Patent and making part of the same.*

TO ALL WHOM IT MAY CONCERN:

Be it known that I, LUCIUS JORDAN, of Southington, in the county of Hartford, and State of Connecticut, have invented certain new and useful improvements in "Wrenches;" and do hereby declare that the following is a full, clear, and exact description thereof, reference being had to the accompanying drawings, and to the letters of reference marked thereon.

In the annexed drawings making part of this specification, A represents a metallic bar, which is provided with a jaw, B, and which is made square from this jaw to the point $x'$ $x'$; it is also provided with two screw-threads, one from $o$ to $o$, and one at its end, over which the nut H passes. D represents a metallic sleeve, which is provided with a jaw, C. This sleeve has a square opening through it, longitudinally, into which fits the square portion of the bar A. Upon a portion of the outside surface of this sleeve is cut a screw-thread, which takes into the thread of a female screw cut in another sleeve, E. The sleeve E has an opening in that end of it toward the handle G, which fits snugly over the bar A from $x'$ to $o$, the bar being round at this point, so as to enable the sleeve to turn easily upon it. This sleeve E is prevented from passing toward the jaw B or bar A, by a shoulder on said bar at $x'$ $x'$. F represents a nut, which is passed over the bar A, and is provided with a thread, which fits over the thread from $o$ to $o$ on said bar. This nut forms a shoulder, when secured in position, which keeps the sleeve E from slipping back. The nut F is provided with an annular recess at that end next to the handle G, into which a round tenon on the handle is made to fit. G represents the handle, which is turned of wood, and which is provided with a hole through it from end to end, through which the outer end of the bar A passes. H represents a nut on the end of bar A, which is provided with a round tenon, which passes into a recess made to receive it in the end of the handle next to it. By means of the two nuts F and H the handle G is very easily and permanently secured upon the bar A. When the two jaws B and C are opened as wide as possible, the end $x$ $x$ of sleeve D strikes the back of sleeve E at $x'$ $x'$. The jaw C is made to move to or from jaw B by turning the sleeve E in one direction or the other.

Having thus fully described my invention, what I claim as new, and desire to secure by Letters Patent, is—

The arrangement of the bar A, sleeves D and E, nuts F and H, and handle G, the several parts being constructed and arranged in the manner and for the purpose herein specified.

In testimony that I claim the foregoing I have hereunto set my hand and seal this 18th day of February, 1867

LUCIUS JORDAN

Witnesses:
HENRY R. BRADLEY,
GEORGE B. LEWIS.